United States Patent
Chen et al.

(10) Patent No.: US 9,666,145 B2
(45) Date of Patent: May 30, 2017

(54) METHOD AND APPARATUS FOR CONTROLLING BRIGHTNESS COMPENSATION FOR PIXEL UNITS OF DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Huijuan Chen, Beijing (CN); Hyungkyu Kim, Beijing (CN); Duo Zhang, Beijing (CN); Yang Chen, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 283 days.

(21) Appl. No.: 14/491,200

(22) Filed: Sep. 19, 2014

(65) Prior Publication Data

US 2015/0255025 A1     Sep. 10, 2015

(30) Foreign Application Priority Data

Mar. 6, 2014   (CN) .......................... 2014 1 0081551

(51) Int. Cl.
*G09G 3/36*      (2006.01)
*H04N 9/31*      (2006.01)

(52) U.S. Cl.
CPC ......... *G09G 3/3607* (2013.01); *H04N 9/3182* (2013.01); *G09G 2320/0233* (2013.01); *G09G 2320/0693* (2013.01)

(58) Field of Classification Search
None
See application file for complete search history.

(56) References Cited

U.S. PATENT DOCUMENTS

2006/0268003 A1    11/2006   Tanase et al.
2007/0103085 A1*   5/2007    Itoh .......................... G09G 3/22
                                                                     315/3

(Continued)

FOREIGN PATENT DOCUMENTS

CN    1979603 A     6/2007
CN    101640038 A   2/2010

(Continued)

OTHER PUBLICATIONS

First Office Action regarding Chinese application No. 201410081551.5, dated Aug. 6, 2015. Translation provided by Dragon Intellectual Property Law Firm.

*Primary Examiner* — Vu Nguyen
(74) *Attorney, Agent, or Firm* — Harness, Dickey & Pierce, P.L.C.

(57) ABSTRACT

The present disclosure provides a method for controlling brightness compensation for pixel units of a display device, comprising: driving white subpixels in the pixel units to compensate the pixel units for the brightness according to predetermined pixel units whose brightness is to be compensated for in the display device and compensating grayscale voltages corresponding to the brightness of the pixel units to be compensated.

12 Claims, 3 Drawing Sheets

(56) References Cited

U.S. PATENT DOCUMENTS

2007/0126758 A1* 6/2007 Hwang .................. G09G 3/006
345/690
2011/0012943 A1* 1/2011 Tsai ..................... G09G 3/3426
345/690

FOREIGN PATENT DOCUMENTS

CN 103295485 A 9/2013
JP 2004198875 A 7/2004

* cited by examiner

METHOD AND APPARATUS FOR CONTROLLING BRIGHTNESS COMPENSATION FOR PIXEL UNITS OF DISPLAY DEVICE

CROSS-REFERENCE TO RELATED APPLICATION

The present application claims a priority of the Chinese patent application No. 201410081551.5, filed on Mar. 6, 2014, which is incorporated herein by reference in its entirety.

TECHNICAL FIELD

The present disclosure relates to the field of display technology, in particular to a method and an apparatus for controlling brightness compensation for pixel units of a display device.

BACKGROUND

Display quality of an image is one of the indicators for judging the performance of a display device in the field of display technology; and the image display with high quality is always a desirable goal for the manufacturers. Currently, for a large-size display device, there is a problem that the brightness display is uneven. This uneven brightness display is mainly caused by both uneven electrical properties of thin film transistors (TFTs) in a back plate and uneven backlight provided by a backlight module arranged at the back of a liquid crystal display (LCD) panel.

The uneven backlight from a backlight source is mainly derived from the structural design of the backlight module. Currently, a typical backlight module includes a backlight source (e.g., an LED light stripe), a reflector, a light guide plate, a diffuser, and a prism film. Especially, two diffusers are required. The light from a point light source LED is reflected by the light guide plate, and thereby an area (surface) light source is formed. The light from the area light source is transmitted by the reflector below the light guide plate toward the diffuser, and then enters a display panel through the prism film.

Generally, the backlight module of an LCD panel includes a dozen of, or dozens of, Light Emitting Diodes (LEDs). The LEDs are packaged into a light stripe and then fixed at a side of the LCD module. In actual production, it is impossible to ensure the even brightness for respective regions of the entire LCD panel, so the backlight brightness is uneven. For example, for an image of a solid color, both bright and dark regions will occur, and thereby the image quality of the LCD panel will be affected adversely.

In the prior art, the machining precision and the quality of the backlight source may be improved so as to prevent the occurrence of uneven backlight brightness. However, in this way, it is impossible to obtain a desired effect, and meanwhile the cost of the LCD module will increase dramatically.

SUMMARY

An object of the present disclosure is to provide a method and an apparatus for controlling brightness compensation for pixel units of a display device, so as to compensate an LCD panel for backlight brightness by using white subpixels, thereby to improve display quality of an image.

In one aspect, the present disclosure provides a method for controlling brightness compensation for pixel units of a display device, which may include a step of:

driving white subpixels in the pixel units to compensate the pixel units for the brightness according to predetermined pixel units whose brightness is to be compensated for in the display device and compensating grayscale voltages corresponding to the brightness of the pixel units to be compensated.

Further, prior to the step of driving the white subpixels in the display device, the method may include a step of determining compensating grayscale voltages corresponding to the white subpixels in the pixel units whose brightness is to be compensated for. To be specific, this step may include:

reading an initial grayscale voltage corresponding to the white subpixels in the display device; and determining the compensating grayscale voltages corresponding to the white subpixels according to the initial grayscale voltage and predetermined compensation coefficients for the grayscale voltages corresponding to the white subpixels.

Further, the compensating grayscale voltages corresponding to the white subpixels may be determined by using the equation $V_{ij}=\eta_{ij}*V_{max}$, where $V_{ij}$ represents the compensating grayscale voltage corresponding to the white subpixel in the $i^{th}$ row and the $j^{th}$ column, $V_{max}$ represents the initial grayscale voltage, and $\eta_{ij}$ represents the compensating coefficient corresponding to the white subpixel in the $i^{th}$ row and the $j^{th}$ column, and i and j are positive integers.

Further, prior to reading the initial grayscale voltage corresponding to the white subpixels in the display device, the method may further include a step of determining the compensating coefficients for the grayscale voltages corresponding to the white subpixels. To be specific, this step may include:

selecting a grayscale voltage corresponding to a maximum grayscale value, and driving subpixels in the display device with the grayscale voltage so as to display a white image, each of the subpixels at least including a white subpixel, a red subpixel, a green subpixel and a blue subpixel;

measuring, by a brightness measuring device, brightness values of the respective subpixels corresponding to the white image at a light-exiting side of the display device; and determining an evenly-divided region with the maximum brightness, the brightness value corresponding to the evenly-divided region being a maximum brightness value, from a plurality of evenly-divided regions; determining a brightness difference between a brightness value of each evenly-divided region and the maximum brightness value according to the maximum brightness value; and comparing the grayscale voltage corresponding to the brightness difference of each evenly-divided region with the grayscale voltage corresponding to the maximum grayscale, resultant ratios being the compensation coefficients for the grayscale voltages corresponding to the white subpixels in the evenly-divided regions.

To be specific, the step of determining an evenly-divided region with the maximum brightness, the brightness value corresponding to the evenly-divided region being a maximum brightness value, from a plurality of evenly-divided regions; determining the brightness difference between the brightness value of each evenly-divided region and the maximum brightness value according to the maximum brightness value; and comparing the grayscale voltage corresponding to the brightness difference of each evenly-divided region with the grayscale voltage corresponding to the maximum grayscale, the resultant ratios being the compensation coefficients for the grayscale voltages corresponding to the white subpixels in the evenly-divided regions may include:

determining a pixel unit with the maximum brightness, the brightness value corresponding to the pixel unit being a maximum brightness value; determining a brightness difference between a brightness value of each pixel unit and the maximum brightness value; and comparing the grayscale voltage corresponding to the brightness value of each pixel unit with the grayscale voltage corresponding to the maximum grayscale, resultant ratios being the compensation coefficients for the grayscale voltages corresponding to the white subpixels in the pixel unit.

Further, when the display device is powered on, the initial grayscale voltage corresponding to the white subpixels in the display device may be read.

Further, the initial grayscale voltage may be an initial grayscale voltage corresponding to the maximum grayscale.

In another aspect, the present disclosure provides an apparatus for controlling brightness compensation for pixel units of a display device, which may include:

a brightness compensating unit configured to drive white subpixels in the pixel units to compensate the pixel units for the brightness according to predetermined pixel units whose brightness is to be compensated for in the display device and compensating grayscale voltages corresponding to the brightness of the pixel units to be compensated.

Further, the apparatus may further include a compensating grayscale voltage determining unit configured to, before the brightness compensating unit drives the white subpixels, determine compensating grayscale voltages corresponding to the white subpixels in the pixel units whose brightness is to be compensated for. To be specific, the compensating grayscale voltage determining unit may be configured to read an initial grayscale voltage corresponding to the white subpixels in the display device, and determine the compensating grayscale voltages corresponding to the white subpixels according to the initial grayscale voltages and predetermined compensation coefficients for the grayscale voltages corresponding to the white subpixels.

Further, the compensating grayscale voltages corresponding to the white subpixels may be determined by using the equation $V_{ij}=\eta_{ij}*V_{max}$, where $V_{ij}$ represents the compensating grayscale voltage corresponding to the white subpixel in the $i^{th}$ row and the $j^{th}$ column, $V_{max}$ represents the initial grayscale voltage, and $\eta_{ij}$ represents the compensating coefficient corresponding to the white subpixel in the $i^{th}$ row and the $j^{th}$ column, and i and j are positive integers.

Further, the apparatus may further include a compensation coefficient determining unit configured to select a grayscale voltage corresponding to a maximum grayscale value, and drive subpixels in the display device with the grayscale voltage so as to display a white image, each of the subpixels at least including a white subpixel, a red subpixel, a green subpixel and a blue subpixel; measure, by a brightness measuring device, brightness values of the respective subpixels corresponding to the white image at a light-exiting side of the display device; and determine an evenly-divided region with the maximum brightness, the brightness value corresponding to the evenly-divided region being a maximum brightness value, from a plurality of evenly-divided regions; determine a brightness difference between a brightness value of each evenly-divided region and the maximum brightness value according to the maximum brightness value; and compare the grayscale voltage corresponding to the brightness difference of each evenly-divided region with the grayscale voltage corresponding to the maximum grayscale, resultant ratios being the compensation coefficients for the grayscale voltage corresponding to the white subpixels in the evenly-divided regions.

Further, the compensation coefficient determining unit may be specifically configured to determine a pixel unit with the maximum brightness, the brightness value corresponding to the pixel unit being a maximum brightness value; determine a brightness difference between a brightness value of each pixel unit and the maximum brightness value; and compare the grayscale voltage corresponding to the brightness value of each pixel unit with the grayscale voltage corresponding to the maximum grayscale, resultant ratios being the compensation coefficients for the grayscale voltages corresponding to the white subpixels in the pixel unit.

Further, when the display device is powered on, the initial grayscale voltage corresponding to the white subpixel in the display device may be read.

Further, the initial grayscale voltage may be an initial grayscale voltage corresponding to the maximum grayscale.

In the present disclosure, the white subpixels are driven to compensate the pixel units for the brightness of the pixel units according to the compensating grayscale voltages corresponding to the predetermined brightness of the pixel units whose brightness is to be compensated for in the display device. For the display device having white subpixels, it is able to compensate an LCD panel for the backlight brightness by using the white subpixels, thereby to compensate for the uneven brightness caused by both uneven electrical properties of a TFT in a back plate and a backlight module arranged at the back of the LCD panel.

DETAILED DESCRIPTION

The present disclosure provides a method and an apparatus for controlling brightness compensation for pixel units of a display device, so as to compensate an LCD panel for backlight brightness by using white subpixels, thereby to improve display quality of an image.

The term "grayscale" will be briefly described hereinafter.

Usually, each point of an image displayed on a display device consists of three subpixels, i.e., a red subpixel, a green subpixel and a blue subpixel. A light source behind each subpixel may show different brightness levels, and grayscale represents different levels from the brightest to the darkest. The more the levels, the better the display effect of the image. For example, 256 brightness levels are called as 256 grayscales. A change in the color of each point of the image represents a change in the grayscales of the three subpixels forming this point, and there is a difference between ideal brightness corresponding to respective grayscales of each subpixel and actual brightness corresponding to respective grayscales of each subpixel during the actual display.

In a preferred embodiment of the present disclosure, for a display device with white subpixels, it is able to compensate an LCD panel for backlight brightness by using the white subpixels, thereby to compensate for the uneven brightness caused by both uneven electrical properties of a TFT in a back plate and a backlight module arranged at the back of the LCD panel.

Of course, the scheme for the brightness compensation provided by the present disclosure is not limited to be achieved by the white subpixels, and it may also be achieved by near white subpixels. In other words, this scheme may use the subpixels that emit light in any colors, as long as it can increase the brightness of the pixels and the color of the light will not affect an actual display effect of an image.

The display device of the present disclosure may be a liquid crystal display device, or an organic light-emitting device (OLED).

Figure 1:
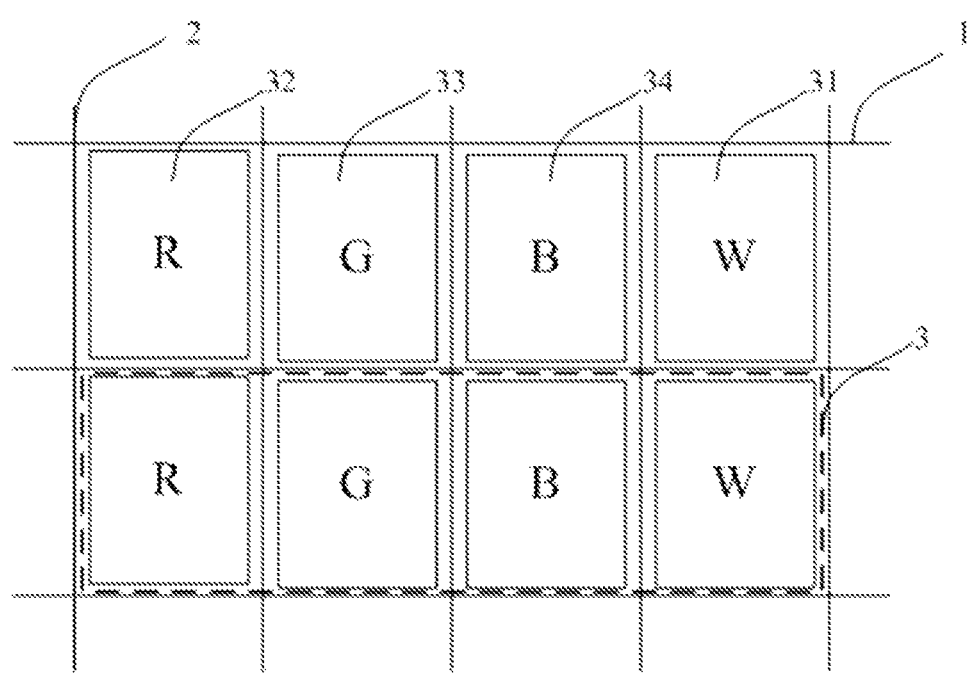
FIG. 1 is a schematic view showing a pixel array according to one embodiment of the present disclosure.

The following description is given by taking the liquid crystal display device with a backlight module as well as a pixel array in FIG. 1 as an example.

Referring to FIG. 1, a typical pixel array includes a plurality of pixel units formed by gate lines 1 and data lines 2 in a matrix form. Each pixel unit 3 includes a white (W) subpixel 31, a red (R) subpixel 32, a green (G) subpixel 33 and a blue (B) subpixel 34.

A method and an apparatus for controlling brightness compensation for pixel units of a display device will be described hereinafter in conjunction with the pixel array in FIG. 1.

The method for controlling the brightness compensation for pixel units of the display device includes a step of:

driving white subpixels in the pixel units to compensate the pixel units for the brightness according to predetermined pixel units whose brightness is to be compensated for in the display device and compensating grayscale voltages corresponding to the brightness of the pixel units to be compensated.

The predetermined pixel units whose brightness is to be compensated for may be pixel units described in the following two modes.

Mode 1: the pixel units whose brightness is to be compensated for are pixel units corresponding to a compensating grayscale voltage merely with a non-zero value. For example, if pixel regions whose brightness is required to be compensated for and the other pixel regions whose brightness is not required to be compensated for are determined through visual observation or other test modes, it is merely required to determine the compensating grayscale voltage corresponding to the pixel units whose brightness is to be compensated for, and drive the white subpixels in the pixel units whose brightness is to be compensated for.

Mode 2: the pixel units whose brightness is to be compensated for are pixel units corresponding to the compensating grayscale voltage with a zero value. In other words, the compensating grayscale voltages corresponding to the brightness of each pixel unit to be compensated for are determined by detecting each pixel unit. If the brightness of some pixel units is not required to be compensated for, the compensating grayscale voltage for these pixel units is determined as zero. During the implementation, no voltage may be applied to these pixel units and no brightness compensating operation will be performed thereon. Of course, the compensating grayscale voltage with a value of zero may also be applied to these pixel units.

The compensating grayscale voltage corresponding to the white subpixels of the pixel units may be directly determined on the basis of the compensating grayscale voltages of the pixel units whose brightness is to be compensated for, or the predetermined compensating grayscale voltages corresponding to the white subpixels may be indirectly determined in other ways. The predetermined compensating grayscale voltages corresponding to the white subpixels may be predetermined voltage values stored in a time sequence controller (Tcon), or values obtained by adjusting an initial grayscale voltage derived from a signal source.

Preferably, when the display device is powered on, the white subpixels are driven according to the predetermined compensating grayscale voltages corresponding to the white subpixels in the pixel units whose brightness is to be compensated for in the display device, so as to compensate the pixel unit for the brightness.

In this embodiment of the present disclosure, the brightness of a dark region or dark regions on the display panel caused by the uneven backlight brightness is compensated for by using the white subpixels in the pixel array. The dark region(s) has (have) a brightness value less than a predetermined brightness value. As a result, the implementation of this method will be simpler, and a better brightness compensation effect and a higher display quality for the image will be obtained.

Figure 2:
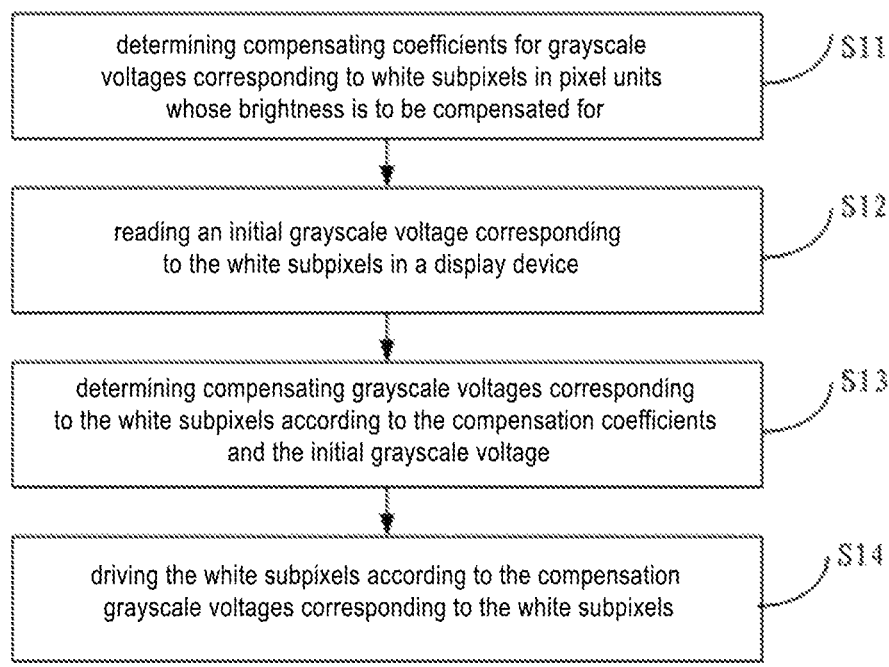
FIG. 2 is a flow chart of a method for controlling brightness compensation for a display device according to one embodiment of the present disclosure.

Referring to FIG. 2, which is a flow chart of the method for controlling the brightness compensation for the pixel units of the display device, the method includes the following steps.

Step S11: determining compensating coefficients for the grayscale voltage corresponding to the white subpixels in the pixel units whose brightness is to be compensated for. The number of pixel units whose brightness is to be compensated for may be one, or more, or all, of the pixel units. The pixel units whose brightness is to be compensated for may be the pixel units described in the above modes (i.e., mode 1 and mode 2).

Step S12: reading the initial grayscale voltage corresponding to the white subpixels in the display device. The initial grayscale voltage is a grayscale voltage corresponding to a maximum grayscale value. A pixel driving voltage corresponding to grayscale 255 (GL255) is set as GAMMA 255, while the pixel driving voltage corresponding to GL0 is set as GAMMA 0. The grayscale voltage $U_{max}$ corresponding to the maximum grayscale is GAMMA 255, i.e., GAMMA 255 is the grayscale voltage corresponding to the maximum grayscale.

Preferably, when the display device is powered on, the initial grayscale voltage corresponding to the white subpixels in the pixel units whose brightness is to be compensated for in the display device is read.

Further, the initial grayscale voltage is the one corresponding to the maximum grayscale.

Step S13: determining the compensating grayscale voltages corresponding to the white subpixels according to the compensation coefficients and the initial grayscale voltage.

The compensating grayscale voltages are grayscale voltages corresponding to the compensation brightness.

Step S14: driving the white subpixels according to the compensation grayscale voltages corresponding to the white subpixels, so as to compensate the pixel units for the brightness.

During the implementation, the compensation coefficients are written into the time sequence controller Tcon of the LCD panel. When the LCD panel is powered on, Gates are turned on sequentially, and a source driving circuit receives driving voltage data for each white subpixel or predetermined white subpixels from Tcon, processes the driving voltage data and then outputs the driving voltages for the white subpixels.

For example, the source driving circuit receives the driving voltage data for the white subpixel, the red subpixel, the green subpixel and the blue subpixel. Taking 8-bit as an example, the driving voltage data for these subpixels is 8-bit binary data. The source driving circuit converts it into 256 grayscale voltages, i.e., GAMMA 0 to GAMMA 255, and outputs the grayscale voltages to the display panel. The grayscale voltages corresponding to the white subpixels in the pixel unit whose brightness is required to be compensated for depend on the compensation coefficients. When the pixel units whose brightness is to be compensated for are pixel units described in the above mode 2, if the compensation coefficient corresponding to a certain white subpixel is 0, the source driving circuit will not output the grayscale voltage corresponding to the white subpixel. For the entire pixel, because the brightness of the pixel units is compensated for by using the white subpixels, the brightness of the entire dark region increases. As a result, it is able to prevent the occurrence of the dark region due to the uneven backlight brightness, and improve the display quality of the image.

The white subpixels in the pixel unit whose brightness is required to be compensated for in the LCD panel are driven by using the compensating grayscale voltages.

The white subpixels have an identical initial grayscale voltage and different compensation coefficients, so the compensating grayscale voltages for the white subpixels in different regions are different from each other.

When the pixel units whose brightness is to be compensated for are pixel units described in the above mode 2, step S11 of determining the compensation coefficient for the grayscale voltage corresponding to each white subpixel will be described hereinafter.

Figure 3:
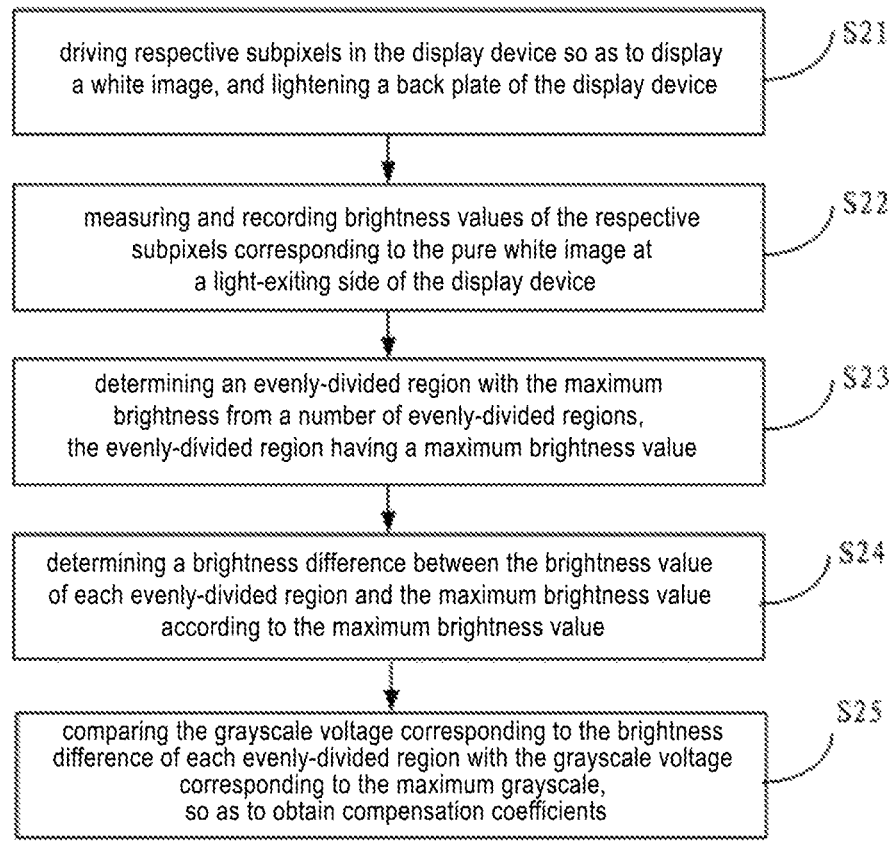
FIG. 3 is a flow chart of determining compensation coefficients for grayscale voltages corresponding to each white subpixel according to one embodiment of the present disclosure.

Referring to FIG. 3, step S11 of determining the compensation coefficients for the grayscale voltages corresponding to the white subpixels may include the following steps.

Step S21: selecting the grayscale voltage $U_{max}$ corresponding to the maximum grayscale, driving respective subpixels in the display device with the grayscale voltage $U_{max}$ so as to display a white image, preferably a pure white image, and lightening a back plate of the display device. The subpixels at least include the white subpixel, the red subpixel, the green subpixel and the blue subpixel.

For example, a grayscale corresponding to a monochromatic testing pattern is selected. When the driving voltage for each subpixel is GAMMA 255, it is able to display a pure white image. The LCD brightness of a GL255 image is the strongest, and at this time, it is easy to observe regions with the uneven backlight brightness. Of course, apart from the grayscale voltage $U_{max}$ corresponding to the maximum grayscale, the grayscale voltage corresponding to any grayscales approximate to GL255 may be selected so as to drive the subpixels in the display device to display an image.

It is to be noted that, the display device may be a liquid crystal display device with a backlight module, or a self-luminous organic light-emitting display (OLED) device. If the display device is the liquid crystal display device with the backlight module, the uneven brightness is caused by both uneven electrical properties of TFTs in the pixel array and the backlight module, and the method of the present disclosure can be used to compensate for this uneven brightness. In other words, once a hardware structure of the display device is determined, it is able to at least compensate for the uneven brightness caused by the hardware of the display device using the method for controlling the brightness compensation for the pixel units of the display device in the present disclosure.

Step S22: measuring and recording, by a brightness measuring device, brightness values of respective subpixels corresponding to the white image or the pure white image at a light-exiting side of the display device, i.e., measuring the brightness values of the display device after the back plate is lightened.

The brightness measuring device may be any device capable of measuring the pixel-level brightness, e.g., a camera. When the camera collects grayscale images from the liquid crystal display panel, if a resolution of the camera is approximate to that of the liquid crystal display device, the collected brightness values will be more accurate. Taking the liquid crystal display device with a resolution of 1280*800 as an example, a GL255 image collected by the camera has an identical resolution to the liquid crystal display panel, i.e., 1280*800.

If the display panel includes i rows and j columns of subpixels, the brightness value of each subpixel unit will be expressed as $L_{ij}$ (i=1, 2, 3, . . . ; j=1, 2, 3, . . . ).

Step S23: determining an evenly-divided region with the maximum brightness from a number of evenly-divided regions. This evenly-divided region has a maximum brightness value $L_{max}$.

Step S24: determining a brightness difference $\Delta L_x$(x=1, 2, 3, . . . , n) between the brightness value of each evenly-divided region and the maximum brightness value $L_{max}$ according to the maximum brightness value $L_{max}$. This brightness difference corresponds to the compensation brightness, and the grayscale voltage corresponding to the compensation brightness is the compensating grayscale voltage.

Step S25: comparing the grayscale voltage $\Delta U_x$ corresponding to the brightness difference $\Delta L_x$ of each evenly-divided region with the grayscale voltage $U_{max}$ corresponding to the maximum grayscale. The resultant ratios $\Delta U_x/U_{max}$ are the compensation coefficients for the grayscale voltages corresponding to the white subpixels in the evenly-divided regions.

The number of the subpixels covered by each evenly-divided region may be set in accordance with the practical need. When each evenly-divided region covers more than one white subpixels, i.e., when each evenly-divided region covers more than one pixel units, the compensation coefficient for one of the white subpixels may be determined as $\Delta U_x/U_{max}$, while the compensation coefficient for other white subpixels is zero. In other words, the brightness of the evenly-divided region is merely compensated for by using one white subpixel.

The less the number of the pixels covered by each evenly-divided region, the more the amount of data to be processed. If it is required to reduce the amount of the data to be processed, each evenly-divided region may include two or more pixels, i.e., the evenly-divided region will be judged as a dark region only when successive pixels are relatively dark. As a result, it is able to improve the image quality while reducing the amount of the data to be processed. The term "pixel" herein refers to the pixel unit.

In order to improve the image quality precisely, the brightness of each pixel unit may be compensated for.

Preferably, each evenly-divided region may be a region corresponding to a pixel unit which includes a white subpixel, a red subpixel, a green subpixel and a blue subpixel.

To be specific, step S23 includes determining a pixel unit with the maximum brightness, i.e., the brightness value corresponding to the evenly-divided region being a maximum brightness value. Step S24 includes determining the brightness difference $\Delta L(i,j)$ between the brightness value of each pixel unit and the maximum brightness value, as shown in the following matrix.

$$\begin{bmatrix} 0 & 0 & . & . & . & . & . & . & . & . & 0 \\ 0 & 0 & & \Delta L(i,j) & & \Delta L(i,j+1) & & & & & 0 \\ . & & & & & & & & & & . \\ . & & \Delta L(i+1,j) & & \Delta L(i+1,j+1) & & . & & & & . \\ . & & & & & & & & & & . \\ . & & \Delta L(i+2,j) & & \Delta L(i+2,j+2) & & . & & & & . \\ 0 & 0 & . & . & . & . & . & . & . & . & 0 \end{bmatrix}$$

In this matrix, there are m rows and n columns of pixels, and the brightness difference between the brightness value of each pixel unit and the maximum brightness value is $\Delta L(i,j)$. Step 25 includes comparing the grayscale voltage $\Delta U(i,j)$ corresponding to the brightness difference $\Delta L(i,j)$ of each pixel unit with the grayscale voltage GAMMA 255 corresponding to the maximum grayscale. The resultant ratio is the compensation coefficient $\eta_{ij}$ for the grayscale voltage corresponding to the white subpixel in the pixel unit, i.e., $\eta_{ij}=\Delta U(i,j)/\text{GAMMA } 255$.

In the present disclosure, the compensation coefficient for the white subpixel corresponding to any $\Delta L(i,j)$, or for the white subpixel corresponding to $\Delta L(i,j)$ greater than a predetermined brightness difference a, may be determined.

If a=0, i.e., all the pixel points having brightness values less than $L_{max}$ are recorded, there will be a large number of data for the pixel points whose brightness is to be compensated for. Actually, it is impossible for human eyes to distinguish the brightness difference within a certain range. For a general LCD, the brightness of GL255 is generally between 300 and 400 lm, so a may be of a value between 10 and 50 lm. In other words, when $\Delta L(i,j)$ is greater than a range between 10 and 50 lm, the compensation coefficient for the white subpixel corresponding to $\Delta L(i,j)$ will be determined; and when $\Delta L(i,j)$ is less than a range between 10 and 50 lm, the compensation coefficient for the white subpixel corresponding to $\Delta L(i,j)$ will be determined as 0, i.e., $74_{ij}=0$.

The compensation coefficients for the driving voltages of the white subpixels may be written by an LCD connector. For example, Tcon is communicated with an external terminal via an I2C interface, and the compensation coefficients may be written into a RAM of Tcon via an SCL and an SDA. However, the present disclosure is not particularly limited to the I2C interface.

In the above embodiment, the camera is used to collect the LCD GL255 image so as to find the dark region in the LCD caused by the uneven backlight brightness, and the brightness of the dark region is compensated for by using the white subpixels. As a result, it is able to provide even brightness for the regions in the LCD, thereby to improve the display quality of the image. The dark region refers to the pixel region where the driving voltage for the white subpixel is not zero.

An apparatus corresponding to the above-mentioned method, i.e., the apparatus for controlling brightness compensation for pixel units of a display device, will be described hereinafter.

Figure 4:
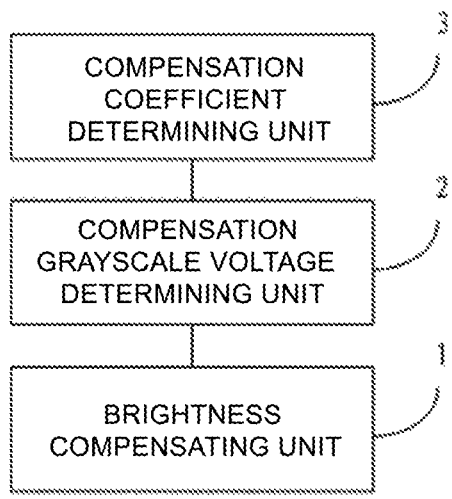
FIG. 4 is a schematic view showing an apparatus for controlling brightness compensation for pixel units in a display device according to one embodiment of the present disclosure.

Referring to FIG. 4, which is a schematic view showing an apparatus for controlling brightness compensation for pixel units of a display device, the apparatus includes a brightness compensating unit 1 configured to drive white subpixels in the pixel units to compensate the pixel unit for the brightness according to predetermined pixel units whose brightness is to be compensated for in a display device and compensating grayscale voltages corresponding to the brightness of the pixel units to be compensated.

Preferably, referring to FIG. 4, the apparatus further includes a compensating grayscale voltage determining unit 2 configured to, before the brightness compensating unit drives the white subpixels, determine compensating grayscale voltages corresponding to the white subpixels in the pixel units whose brightness is to be compensated for. To be specific, the compensating grayscale voltage determining unit is configured to read an initial grayscale voltage corresponding to the white subpixels in the display device, and determine the compensating grayscale voltages corresponding to the white subpixels according to the initial grayscale voltage and predetermined compensation coefficients for the grayscale voltages corresponding to the white subpixels.

Preferably, the compensating grayscale voltage corresponding to the white subpixel is determined by using the equation $V_{ij}=\eta_{ij}*V_{max}$, where $V_{ij}$ represents the compensating grayscale voltage corresponding to the white subpixel in the $i^{th}$ row and the $j^{th}$ column, $V_{max}$ represents the initial grayscale voltage, and $\eta_{ij}$ represents the compensating coefficient corresponding to the white subpixel in the $i^{th}$ row and the $j^{th}$ column.

Further, referring to FIG. 4, the apparatus further includes a compensation coefficient determining unit 3 configured to select a grayscale voltage corresponding to a maximum grayscale value, and drive subpixels in the display device with the grayscale voltage so as to display a white image, the subpixels at least including a white subpixel, a red subpixel, a green subpixel and a blue subpixel; measure, by a brightness measuring device, brightness values of the respective subpixels corresponding to the white image at a light-exiting side of the display device; and determine an evenly-divided region with the maximum brightness, i.e., the brightness value corresponding to the evenly-divided region being a maximum brightness value, from a plurality of evenly-divided regions; determine a brightness difference between a brightness value of each evenly-divided region and the maximum brightness value according to the maximum brightness value; and compare the grayscale voltage corresponding to the brightness difference of each evenly-divided region with the grayscale voltage corresponding to the maximum grayscale, the resultant ratios being the compensation coefficients for the grayscale voltages corresponding to the white subpixels in the evenly-divided region.

Preferably, the compensation coefficient determining unit 3 is specifically configured to determine a pixel unit with the maximum brightness, i.e., the brightness value corresponding to the pixel unit being a maximum brightness value, determine a brightness difference between a brightness value of each pixel unit and the maximum brightness value, and compare the grayscale voltage corresponding to the brightness value of each pixel unit with the grayscale voltage corresponding to the maximum grayscale, the resultant ratios being the compensation coefficients for the grayscale voltages corresponding to the white subpixels in the pixel units.

Preferably, when the display device is powered on, the initial grayscale voltage corresponding to the white subpixel in the display device is read.

Preferably, the initial grayscale voltage is an initial grayscale voltage corresponding to the maximum grayscale.

It is to be noted that, the above embodiments for the method may also be applied to the apparatus, which will not be repeated herein.

Several illustrative details are described in the specification, so as to facilitate the understanding of the present disclosure. However, it should be appreciated that, not all of these specific details are necessary for the implementation of the present disclosure. It should be also appreciated that, the present disclosure may usually be described with a procedure in the form of a flow chart, a flow diagram, a structural diagram or a block diagram. Although the flow chart is used to describe the steps as an ordered procedure, some of the steps may be performed in parallel or concurrently. In addition, the steps may also be reordered.

As is well known in the art, the above steps may be performed by hardware, software, or a combination thereof. Some parts of the embodiments may be achieved by using circuits and logic devices (hardware), while the others may be achieved by using instructions stored in a computer-readable storage medium (software). When they are executed by a processor, it is able to implement the method of the present disclosure by the processor. In addition, some embodiments of the present disclosure may be achieved in the hardware separately, while the others may be achieved by the software separately. The various functions may be achieved by a single unit, or a plurality of components using any method. When they are executed by the software, the method may be performed by, such as, a processor of a general purpose computer on the basis of the instructions stored in the computer-readable storage medium. If necessary, the instructions may be stored in the storage medium in a compression and/or encryption form.

In the above embodiments of the present disclosure, for the display device with the white subpixels, it is able to compensate the LCD panel for the backlight brightness by using the white subpixels, thereby to compensate for the uneven brightness display at least caused by both uneven electrical properties of the TFTs in the back plate and the backlight module arranged at the back of the LCD panel.

Obviously, a person skilled in the art may further make improvements and modifications without departing from the spirit of the present invention. If these improvements and modifications fall within the scope of the appended claims and the equivalents thereof, the present invention also intends to include them.

What is claimed is:

1. An apparatus for controlling brightness compensation for pixel units of a display device, comprising:
   a brightness compensating circuit configured to drive white subpixels in the pixel units to compensate the pixel units for the brightness according to predetermined pixel units whose brightness is to be compensated for in the display device and compensating grayscale voltages corresponding to the brightness of the pixel units to be compensated; and
   a compensating grayscale voltage determining circuit configured to, before the brightness compensating circuit drives the white subpixels, determine the compensating grayscale voltages corresponding to the white subpixels in the pixel units whose brightness is to be compensated for, wherein
   the compensating grayscale voltage determining circuit is configured to read an initial grayscale voltage corresponding to the white subpixels in the display device, and determine the compensating grayscale voltages corresponding to the white subpixels according to the initial grayscale voltage and predetermined compensation coefficients for the grayscale voltages corresponding to the white subpixels, wherein the predetermined compensation coefficient is a ratio based on a maximum grayscale value and the grayscale value corresponding to a brightness value of the pixel unit.

2. The apparatus according to claim 1, wherein the compensating grayscale voltages corresponding to the white subpixels are determined by using the equation $V_{ij}=\eta_{ij}*V_{max}$, where $V_{ij}$ represents the compensating grayscale voltage corresponding to the white subpixel in the $i^{th}$ row and the $j^{th}$ column, $V_{max}$ represents the initial grayscale voltage, and $\eta_{ij}$ represents the compensating coefficient corresponding to the white subpixel in the $i^{th}$ row and the $j^{th}$ column, and i and j are positive integers.

3. The apparatus according to claim 1, further comprising:
a compensation coefficient determining circuit configured to select a grayscale voltage corresponding to a maximum grayscale value, and drive subpixels in the display device with the grayscale voltage so as to display a white image, each of the subpixels at least including a white subpixel, a red subpixel, a green subpixel and a blue subpixel; measure, by a brightness measuring device, brightness values of the respective subpixels corresponding to the white image at a light-exiting side of the display device; and determine an evenly-divided region with the maximum brightness, the brightness value corresponding to the evenly-divided region being a maximum brightness value, from a plurality of evenly-divided regions; determine a brightness difference between a brightness value of each evenly-divided region and the maximum brightness value according to the maximum brightness value; and compare the grayscale voltage corresponding to the brightness difference of each evenly-divided region with the grayscale voltage corresponding to the maximum grayscale, resultant ratios being the compensation coefficients for the grayscale voltages corresponding to the white subpixels in the evenly-divided regions.

4. The apparatus according to claim 3, wherein the compensation coefficient determining circuit is specifically configured to select a grayscale voltage corresponding to a maximum grayscale value, and drive subpixels in the display device with the grayscale voltage so as to display a white image, each of the subpixels at least including a white subpixel, a red subpixel, a green subpixel and a blue subpixel; measure, by a brightness measuring device, brightness values of the respective subpixels corresponding to the white image at a light-exiting side of the display device; determine a pixel unit with the maximum brightness, the brightness value corresponding to the pixel unit being a maximum brightness value; determine a brightness difference between a brightness value of each pixel unit and the maximum brightness value; and compare the grayscale voltage corresponding to the brightness value of each pixel unit with the grayscale voltage corresponding to the maximum grayscale, resultant ratios being the compensation coefficients for the grayscale voltages corresponding to the white subpixels in the pixel unit.

5. The apparatus according to claim 1, wherein
when the display device is powered on, an initial grayscale voltage corresponding to the white subpixels in the display device is read.

6. The apparatus according to claim 1, wherein
the initial grayscale voltage is an initial grayscale voltage corresponding to a maximum grayscale.

7. A method for controlling brightness compensation for pixel units of a display device, comprising:
reading an initial grayscale voltage corresponding to the white subpixels in the display device;
determining compensating grayscale voltages corresponding to the white subpixels according to the initial grayscale voltage and predetermined compensation coefficients for the grayscale voltages corresponding to the white subpixels, wherein the predetermined compensation coefficient is a ratio based on a maximum grayscale value and the grayscale value corresponding to a brightness value of the pixel unit; and
driving white subpixels in the pixel units to compensate the pixel units for the brightness according to predetermined pixel units whose brightness is to be compensated for in the display device and the compensating grayscale voltages corresponding to the brightness of the pixel units to be compensated.

8. The method according to claim 7, wherein
the compensating grayscale voltages corresponding to the white subpixels are determined by using the equation $V_{ij}=\eta_{ij}*V_{max}$, where $V_{ij}$ represents the compensating grayscale voltage corresponding to the white subpixel in the $i^{th}$ row and the $j^{th}$ column, $V_{max}$ represents the initial grayscale voltage, and $\eta_{ij}$ represents the compensating coefficient corresponding to the white subpixel in the $i^{th}$ row and the $j^{th}$ column, and i and j are positive integers.

9. The method according to claim 7, wherein
prior to reading the initial grayscale voltage corresponding to the white subpixels in the display device, the method further comprises a step of
determining the compensating coefficients for the grayscale voltages corresponding to the white subpixels,
wherein the step of determining the compensating coefficients for the grayscale voltages corresponding to the white subpixels comprises steps of:
selecting a grayscale voltage corresponding to a maximum grayscale value, and driving subpixels in the display device with the grayscale voltage so as to display a white image, each of the subpixels at least including a white subpixel, a red subpixel, a green subpixel and a blue subpixel;
measuring, by a brightness measuring device, brightness values of the respective subpixels corresponding to the white image at a light-exiting side of the display device; and
determining an evenly-divided region with the maximum brightness, the brightness value corresponding to the evenly-divided region being a maximum brightness value, from a plurality of evenly-divided regions; determining a brightness difference between a brightness value of each evenly-divided region and the maximum brightness value according to the maximum brightness value; and comparing the grayscale voltage corresponding to the brightness difference of each evenly-divided region with the grayscale voltage corresponding to the maximum grayscale, resultant ratios being the compensation coefficients for the grayscale voltages corresponding to the white subpixels in the evenly-divided regions.

10. The method according to claim 9, wherein
the step of determining an evenly-divided region with the maximum brightness, the brightness value corresponding to the evenly-divided region being a maximum brightness value, from a plurality of evenly-divided regions; determining the brightness difference between the brightness value of each evenly-divided region and the maximum brightness value according to the maximum brightness value; and comparing the grayscale voltage corresponding to the brightness difference of each evenly-divided region with the grayscale voltage corresponding to the maximum grayscale, the resultant ratios being the compensation coefficients for the grayscale voltages corresponding to the white subpixels in the evenly-divided regions specifically comprises:
determining a pixel unit with the maximum brightness, the brightness value corresponding to the pixel unit being a maximum brightness value; determining a brightness difference between a brightness value of each pixel unit and the maximum brightness value; and comparing the grayscale voltage corresponding to the brightness value of each pixel unit with the grayscale voltage corresponding to the maximum grayscale, resultant ratios being the compensation coefficients for the grayscale voltages corresponding to the white subpixels in the pixel unit.

11. The method according to claim 7, wherein
when the display device is powered on, an initial grayscale voltage corresponding to the white subpixels in the display device is read.

12. The method according to claim 7, wherein
the initial grayscale voltage is an initial grayscale voltage corresponding to a maximum grayscale.

* * * * *